United States Patent Office 3,461,134
Patented Aug. 12, 1969

3,461,134
IMIDAZOLIDINE DERIVATIVES
Andrew Harper Dinwoodie, Dalry, Godfrey Fort, Ardrossan, and James McAllan Cormack Thompson, Seamill, Scotland, assignors, by mesne assignments, to the United States of America as represented by the Secretary of the Navy
No Drawing. Filed Feb. 23, 1967, Ser. No. 619,512
Claims priority, application Great Britain, Mar. 14, 1966, 11,170/66
Int. Cl. C07d 49/34; C06b 15/02, 15/00
U.S. Cl. 260—309.7                  17 Claims

ABSTRACT OF THE DISCLOSURE

Organic difluoramine compounds which are 1,2-bis[4,5-(difluoramino)-2-oxoimidazolidin-3-yl] - 1,2 - bis(difluoramino)ethanes. A lower alkyl, trinitro lower alkyl, difluoramino lower alkyl or lower acyl group may be present in the 1-position of the oxoimidazolidine ring. The new compounds are useful energetic constituents of high-energy propellent compositions. They may be prepared by reaction of a 1,2-bis(4,5-dihydroxy, -dialkoxy or -diacyloxy-2-oxoimidazolidin-3-yl) ethane-1,2-diol, 1,2-alkoxyethane or -1,2-acyloxyethane, which may contain an alkyl, trinitroalkll or acyl group as defined above or a lower alkoxyalkyl group in 1-position of the oxoimidazolidine ring, with difluoramine in an inert atmosphere and in the presence of an acidic condensing agent.

This invention relates to novel compounds which may be generally classed as difluoramino derivatives of 1,2-bis (2-oxoimidazolidin-3-yl)ethanes, and to the preparation of these compounds.

In accordance with this invention, a difluoramino derivative of a 1,2-bis(2-oxoimidazolidin-3-yl)ethane is prepared by the reaction of a 1,2-bis(2-oxoimidazolidine-3-yl)ethane diol, or an ester or ether derivative thereof, with difluoramine in an inert atomsphere and in the presence of an acidic condensing agent. The term "inert atmosphere" is used herein to denote an atmosphere substantially free from any constituent, such as oxygen, which reacts with difluoramine.

The reaction may be represented as

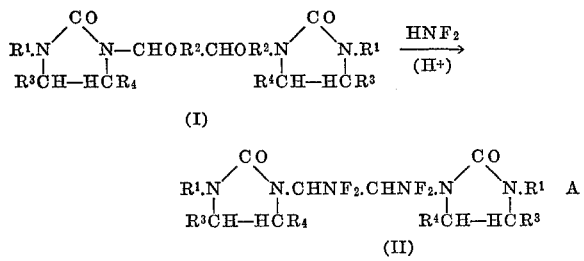

(I)

(II)

where $R^1$ and $R^2$, which may be the same or different, are hydrogen atoms or monovalent groups such as, for example, an alkyl, substituted alkyl, acyl, aroyl or nitro group, and $R^3$ and $R^4$, which may be the same or different, are hydrogen atoms or monovalent organic groups such as, for example, alkyl, hydroxyl, alkoxy, substituted alkoxy, acyl, aroyl, aroyloxy or difluoramino groups.

In those cases where the groups $R^3$ and $R^4$ are capable of reacting with difluoramine and being replaced by difluoramino groups, as, for example, when $R^3$ and $R^4$ are hydroxyl, alkoxy, acyloxy or aroyloxy groups, the reaction may be represented as

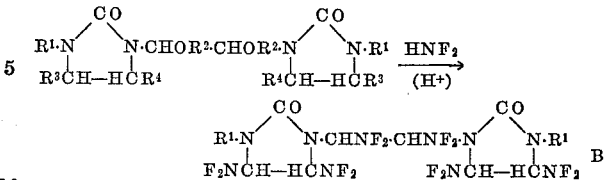

When any of the substituents $R^1$, $R^3$ or $R^4$ contains certain groups which are capable of reacting with difluoramine, for example, when any of these groups contains hydroxyl, aldo or keto groups, this substituent may also be difluoraminated in the course of the reaction. Although, in general, all groups in compounds of Formula I, which are capable of reacting with difluoramine and being replaced with a difluoramino group, react to give the fully difluoraminated derivative, it is found in certain cases that complete difluoramination is precluded by steric effects and in such cases partially difluoraminated products are obtained.

Preferred starting materials of Formula I include compounds wherein $R^1$ is hydrogen, methyl, ethyl, isopropyl, methoxymethyl, trinitroethyl, formyl or acetyl, $R^2$ is hydrogen, methyl or acetyl and $R^3$ and $R^4$ are hydroxyl, methoxy or acetoxy groups.

1,2-bis(2-oxoimidazolidin-3 - yl)ethane derivatives of Formula I may be prepared as described in our co-pending application No. 10,680/66, now British patent specification No. 1,095,866 by the addition of glyoxal to imidazolidin-2-one, or derivatives thereof, in basic aqueous solution.

Compounds of Formula I wherein $R^3$ and $R^4$ are both hydroxyl may be prepared by the reaction of glyoxal with urea or monosubstituted urea in basic aqueous solution also as described in application No. 10,680/66, now British patent specification No. 1,095,866.

The polydifluoramino derivatives of Formula II are preferably prepared from purified material of Formula I but they may also be prepared from the crude material.

The preferred acidic condensing agent is concentrated sulphuric acid of 96–98% strength, but stronger or weaker acid may be also be used. Other condensing agents which may be used are oleum and halogenosulphonic acid such as, for example, fluorosulphonic acid.

The reaction may conveniently be carried out either under autogenous pressure at room temperature, or under atmospheric pressure at a lower temperature. A convenient procedure is to use excess difluoramine and to carry out the reaction under conditions of difluoramine reflux at atmospheric pressure, the reflux temperature being about −23° C.

The presence of a formaldehyde source such as, for example, paraformaldehyde in the reaction mixture appears to lead to the formation of more fully difluoraminated products.

The difluoramino derivatives of the invention are useful energetic constituents of high-energy propellent compositions.

The invention is further illustrated by the following examples in which all parts and percentages are by weight.

EXAMPLE 1

0.98 part of 1,2-bis(4,5-dihydroxy-1-isopropyl-2-oxo-imidazolidin-3-yl)ethane-1,2-diol were treated with 4 parts of difluoramine in a nitrogen atmosphere for 3½ hours. 5.4 parts of 96–98% sulphuric acid were then added slowly, and the difluoramine reflux continued for approximately 8 hours. The excess difluoramine was vented on a stream of nitrogen and the clear solution remaining was poured on to 50 parts of ice. A white solid separated which was extracted with four portions of 18 parts of diethyl ether and the combined ethereal extracts were washed with 25 parts of 3% aqueous sodium bicarbonate, dried over sodium sulphate and evaporated. The resulting white solid was contaminated with a white waxy material which was removed by solution in carbon tetrachloride, leaving 0.77 part (51% of theory) of 1,2-bis[4,5-bis(difluoramino) - 1 - isopropyl - 2 - oxoimidazolidin - 3 - yl]-1,2-bis(difluoramino)ethane as a white solid melting at 170° C. This product contained 28.2% carbon, 3.4% hydrogen, 36.8% fluorine and 23.6% nitrogen 1,2-bis-[4,5 - bis(difluoramino) - 1 - isopropyl - 2 - oxoimidazolidin-3-yl]-1,2-bis(difluoramino)ethane, $C_{14}H_{20}F_{12}N_{10}O_2$, theoretically requires 28.4% carbon, 3.4% hydrogen, 39.2% fluorine and 23.6% nitrogen. The molecular weight of the product determined ebullioscopically in benzene, was found to be 610. The theoretical molecular weight is 588.

The infra-red spectrum of this compound showed strong absorptions at $5.8\mu$ due to =CO, at 10.9 and $11.4–11.6\mu$ due to $—NF_2$ and also at 7.0, 7.9, 8.25, 8.7, 12.3 and $12.7\mu$. Weaker absorptions were shown at 7.7, 9.2, 9.8, 13.3–13.5 and $14.0\mu$. The proton magnetic resonance at 60 megacycles/second in acetone solution, using tetramethylsilane as internal reference, showed a peak at $6.6\tau$, a group of peaks centred on $5.8\tau$, and a group of peaks centred on $3.8\tau$, which were believed to be due to the hydrogen nuclei of the methyl groups, the isopropyl-CH— groups and the imidazolidin-2-one ring-CH and ethane bridge-CH groups, respectively.

EXAMPLE 2

To 7.6 parts of glyoxal monohydrate dissolved in 5 parts of water were added 5.87 parts of ethylurea and 0.25 part of sodium bicarbonate. No solid product separated on standing overnight at room temperature, and removal of the water in vacuo left an amber-coloured syrup containing 1,2-bis(4,5-dihydroxy-1-ethyl-2-oxoimidazolin-3-yl)ethane-1,2-diol.

0.713 part of this syrup were treated with 4 parts of difluoramine and 7.2 parts of 96–98% sulphuric acid by the procedure described in Example 1 to give 0.073 part of 1,2 - bis[4,5 - bis(difluoramino) - 1 - ethyl - 2 - oxoimidazolidin - 3 - yl] - 1,2 - bis(difluoramino)ethane which melted with decomposition at 178° C. The analysis of this product was 25.8% carbon, 3.1% hydrogen, 40.8% fluorine and 24.8% nitrogen. 1,2-bis-[4,5-bis(difluoramino) - 1 - ethyl - 2 - oxoimidazolidin - 3 - yl] - 1,2-bis(difluoramino)ethane, $C_{12}H_{16}F_{12}N_{10}O_2$, theoretically requires 25.7% carbon, 2.9% hydrogen, 40.7% fluorine and 25.0% nitrogen. The molecular weight, determined ebullioscopically in acetone, was found to be 600. The theoretical molecular weight is 560.

The infra-red spectrum of the compound showed strong absorptions at $5.8\mu$ due to =CO, at 10.9 and $11.5\mu$ due to $—NF_2$ and also at 7.1, 7.35, 8.05 and $8.3\mu$. Weaker absorptions were shown at $10.7\mu$ due to $—NF_2$ and also at 9.05, 9.7–9.9, 12.3 and $12.9\mu$. The proton magnetic resonance spectrum at 60 megacycles/sec. of the compound in acetone solution, using tetramethylsilane as internal reference, was indistinct due to the low solubility of the compound. Groups of peaks centred at 6.4 and $3.95\tau$ were present which were tentatively assigned to the hydrogen nuclei of the methyl groups, and the imidazolidine ring-CH and ethane bridge-CH groups, respectively.

EXAMPLE 3

To 15.2 parts of glyoxal monohydrate dissolved in 6 parts of water were added 10 parts of methylurea and 0.6 part of sodium bicarbonate. No solid separated on standing at room temperature, and removal of the water in vacuo left a viscous pale-yellow syrup containing 1,2-bis-(4,5 - dihydroxy - 1 - methyl - 2 - oxoimidazolidin - 3 - yl)ethane-1,2-diol.

1.595 parts of this syrup were treated with 4 parts of difluoramine and 5.4 parts of 96–98% sulphuric acid by the procedure described in Example 1 to give 0.138 part of 1,2-bis[4,5 - bis(difluoroamino) - 1 - methyl - 2 - oxoimidazolidin - 3 - yl] - 1,2 - bis(difluoramino)ethane, which melted with decomposition at 208° C. The analysis of this product was 22.8% carbon, 2.1% hydrogen, 43.2% fluorine and 26.1% nitrogen. 1,2-bis[4,5-bis(difluoramino) - 1 - methyl - 2 - oxoimidazolidin - 3 - yl] - 1,2 - bis (difluoramino)ethane, $C_{10}H_{12}F_{12}N_{10}O_2$, theoretically requires 22.6% carbon, 2.3% hydrogen, 42.9% fluorine and 26.3% nitrogen.

The infra-red spectrum of the compound showed strong absorptions at $5.8\mu$ due to =CO, at 10.2, 11.4 and $11.65\mu$ due to $—NF_2$, and also at 7.2, 7.7, 8.15, 12.2 and 13.1–$13.2\mu$. Weaker absorptions were also shown at 8.55, 8.75, 9.2, 9.6, 9.8–9.9, 10.15, 10.8 and $11.0\mu$. The proton magnetic resonance spectrum at 60 megacycles/second of the compound in acetone solution, using tetramethylsilane as internal reference, showed a triplet centred at $6.67\tau$ ($J=3$ c./sec.) assigned on the basis of chemical shifts to the hydrogen nuclei of the methyl groups, a doublet centred at $5.5\tau$ ($J=12$ c./sec.) assigned to the ethane bridge-CH groups, and a triplet centred at $4.02\tau$ ($J=18$ c./sec.) assigned to the hydrogen nuclei of the imidazolidine ring-CH groups. The $^{19}F$ nuclear magnetic resonance spectrum at 56.458 megacycles/second of the compound in acetone solution, using trichlorofluoromethane as internal reference, showed six peaks at $-26.7$, $-30.2$, $-32.6$, $-33.8$, $-34.2$ and $-37.4\delta$ which were not assigned to any specific fluorine nuclei.

The compound did not ignite or explode when a ½ kg. mild steel hammer was dropped from a height of 10 cm. on to a thin layer of the powder on a mild steel anvil, but exploded violently when the height was 20 cm. Differential thermal analysis showed an exotherm at 220° C. The vacuum thermal stability at 50° C. was 0.2 ml./g./100 hr. The estimated heat of formation, $\Delta H_{f298}$, is $-298.2$ kcal./mole. The calculated monopropellent specific impulse is 233 seconds.

EXAMPLE 4

15.2 parts of glyoxal monohydrate dissolved in 6 parts of water were treated with 8 parts of urea and 0.6 part of sodium bicarbonate at room temperature. A pale-yellow viscous syrupy product containing 1,2-bis(4,5-dihydroxy-2-oxoimidazolidin-3-yl)ethane-1,2-diol was obtained.

1.068 parts of this syrup were treated with 4 parts of difluoramine and 9 parts of 96–98% sulphuric acid by the procedure described in Example 1 to give a resinous partially difluoraminated product which was found to contain 26.1% carbon, 3.1% hydrogen, 37.1% fluorine and 24.0% nitrogen. The fully difluoraminated compound 1,2-bis[4,5-bis(difluoramino)-2-oxoimidazolidin - 3 - yl]-1,2-bis(difluoramino)ethane, $C_8H_8F_{12}N_{10}O_2$, requires 19.1% carbon, 1.6% hydrogen, 45.2% fluorine and 27.8% nitrogen.

EXAMPLE 5

0.423 part of 1,2-bis(4,5-dimethoxy-2-oxoimidazolidin-3-yl)-1,2-dimethoxyethane were treated with 4 parts of difluoramine and 5.4 parts of 96–98% sulphuric acid by the procedure described in Example 1 to give a partially difluoraminated resinous product which was found to contain 27.2% carbon, 3.9% hydrogen, 32.3% fluorine, 22.3% nitrogen and 4.5% methoxy group. The fully difluoraminated compound 1,2-bis[4,5-bis(difluoramino)-2-oxoimidazolidin - 3 - yl] - 1,2-bis(difluoramino)ethane, $C_8H_8F_{12}N_{10}O_2$, requires 19.1% carbon, 1.6% hydrogen, 45.2% fluorine and 27.8% nitrogen.

The infra-red spectrum of the resinous product showed strong absorportions at $5.75\mu$ due to =CO, at 9.15–$9.25\mu$ due to $—OCH_3$, at 11.4–$11.5\mu$ due to $—NF_2$ and also at 7.1, 8.0 and 12.55–$12.65\mu$. Weaker absorptions were shown at $3.05\mu$ due to $—NH$, at $10.85\mu$ due to $—NF_2$ and also at 9.8–$9.9\mu$.

EXAMPLE 6

1.046 parts of 1,2-bis(4,5-dimethoxy-2-oxoimidazolidin-3-yl)-1,2-dimethoxyethane and 0.663 part of paraformaldehyde were treated with 4 parts of difluoramine and 7.2 parts of 96–98% sulphuric acid by the procedure described in Example 1 to give 0.803 part of a partially difluoraminated white resinous product which on heating started to shrink at 45° C. and finally flowed at 58° C. It was found to contain 22.5% carbon, 2.4% hydrogen, 39.0% fluorine, 23.8% nitrogen and 6.7% methoxy group and to have a molecular weight of 518. The fully difluoraminated compound 1,2-bis[4,5-bis(difluoramino)-2-oxoimidazolidin - 3 - yl] - 1,2 - bis(difluoramino)ethane, $C_8H_8F_{12}N_{10}O_2$, requires 19.1% carbon, 1.6% hydrogen, 45.2% fluorine and 27.8% nitrogen and has a molecular weight of 504.

EXAMPLE 7

0.607 part of 1,2-bis(4,5-dimethoxy-2-oxoimidazolidin-3-yl)ethane-1,2-diol were treated with 4 parts of difluoramine and 5.4 parts of 96–98% sulphuric acid by the procedure described in Example 1. 0.54 part of a partially difluoraminated product were obtained as a white resin which flowed at 75° C. and which was found to contain 21.9% carbon, 2.2% hydrogen, 36.2% fluorine and 25.5% nitrogen. The molecular weight of the product, as determined ebullioscopically in acetone, was 440. The fully difluoraminated compound 1,2-bis[4,5-bis(difluoramino)-2-oxoimidazolidin-3-yl] - 1,2 - bis(difluoramino)ethane, $C_8H_8F_{12}N_{10}O_2$, theoretically requires 19.1% carbon, 1.6% hydrogen, 45.2% fluorine and 27.8% nitrogen, and the molecular weight is 504. The infra-red spectrum of the product had strong absorptions at 5.7$\mu$ due to =CO, at 10.85 and 11.45$\mu$ due to —NF$_2$ and also at 7.6, 8.05, 8.75 and 12.75$\mu$. Weaker absorptions were shown at 3.05$\mu$ due to —NH, at 9.2$\mu$ due to —OCH$_3$ and also at 9.8 and 13.95$\mu$.

EXAMPLE 8

The procedure of Example 7 was repeated except that 7.0 parts of 80% sulphuric acid were used in place of 96–98% sulphuric acid. The major product was a partially difluoraminated resin which was found to contain 26.0% carbon, 3.5% hydrogen, 36.0% fluorine and 21.0% nitrogen.

EXAMPLE 9

The procedure of Example 7 was repeated except that 5.4 parts of 20% oleum were used in place of 96–98% sulphuric acid. The major product was a pink-coloured partially difluoraminated resin which was found to contain 23.5% carbon, 2.7% hydrogen, 38.0% fluorine, 25.0% nitrogen and 7.8% methoxy group.

EXAMPLE 10

The procedure of Example 7 was repeated except that 5.4 parts of fluorosulphonic acid were used in place of 96–98% sulphuric acid. The major product was a white partially difluoraminated resin which was found to contain 25.2% carbon, 3.0% hydrogen, 34.1% fluorine, 24.8% nitrogen and 7.5% methoxy group.

EXAMPLE 11

0.48 part of 1,2-bis(4,5-diacetoxy-1-acetyl-2-oxoimidazolidin-3-yl)-1,2-diacetoxyethane were reacted with 4 parts of difluoramine in the presence of 5.8 parts of 20% oleum by the procedure described in Example 1. 0.29 part of a partially difluoraminated product were obtained in the form of an amorphous white powder which was found to contain 21.6% carbon, 2.2% hydrogen, 42.0% fluorine and 25.3% nitrogen. The fully difluoraminated compound 1,2-bis[4,5 - bis(difluoramino)-1-acetyl-2-oxoimidazolidin-3-yl]-1,2-bis(difluoramino)ethane, $$C_{12}H_{12}F_{12}N_{10}O_4$$

requires 24.5% carbon, 2.0% hydrogen, 38.8% fluorine and 23.8% nitrogen. The product burned rapidly on ignition and was soluble in methanol, ethanol, acetone and other solvents.

EXAMPLE 12

A solution of 1.9 parts of glyoxal monohydrate in 1 part of water containing 0.08 part of sodium bicarbonate was added dropwise with stirring to a solution of 7.3 parts of 4,5-dimethoxyimidazolidin-2-one in 8 parts of methanol at 40° C. After 2 hours, a solution of 1.5 parts paraformaldehyde and 0.03 part sodium hydroxide in 8 parts of methanol was added. After standing overnight, 80 parts of methanol and 3 parts of concentrated hydrochloric acid were added to the clear solution. 3 hours later the mixture was neutralised with sodium bicarbonate, filtered and the filtrate evaporated under reduced pressure. The product was a viscous opalescent light-brown syrup containing 1,2-bis(4,5 - dimethoxy-1-methoxymethyl-2-oxoimidazolidin-3-yl)-1,2-dimethoxyethane.

1.25 parts of this syrup were treated with 4 parts of difluoramine and 5.4 parts of 96–98% sulphuric acid by the procedure described in Example 1 to give a clear strawcoloured partially difluoraminated liquid product which was freely soluble in diethyl ether and carbon tetrachloride, and which was found to contain 22.6% carbon, 3.2% hydrogen, 43.0% fluorine and 23.7% nitrogen. The fully difluoraminated compound 1,2-bis[4,5-bis(difluoramino) - 1-difluoraminomethyl-2-oxoimidazolidin-3-yl]-1,2-bis(difluoramino)ethane, $C_{10}H_{12}F_{16}N_{12}O_2$, theoretically requires 18.9% carbon, 1.6% hydrogen, 48.0% fluorine and 26.5% nitrogen.

EXAMPLE 13

0.70 part of 1,2-bis(4,5-dimethoxy-1-(2,2,2-trinitroethyl)-2-oxoimidazolidin-3-yl)-ethane-1,2-diol were treated with 4 parts of difluoramine and 5.4 parts of 96–98% sulphuric acid by the procedure described in Example 1. The product was 0.5 part of a partially difluoraminated amber-coloured viscous liquid which was found to contain 22.6% carbon, 2.6% hydrogen, 19.7% fluorine, 23.7% nitrogen and 2.3% methoxy group. The fully difluoraminated compound 1,2-bis[4,5-bis(difluoramino)-1-(2,2,2-trinitroethyl)-2-oxoimidazolidin-3-yl]-1,2 - bis(difluoramino)ethane, $C_{12}H_{10}F_{12}N_{16}O_{14}$, theoretically requires 17.3% carbon, 1.2% hydrogen, 27.5% fluorine and 27.0% nitrogen.

The infra-red spectrum of the product showed strong absorptions at 5.65$\mu$ due to =CO, at 6.25$\mu$ due to —NO$_2$, at 9.1 and 9.3$\mu$ due to —OCH$_3$, at 10.75 and 11.4$\mu$ due to —NF$_2$ and also at 3.0, 7.0, 7.7, 8.05, 12.2, 12.4 and 12.8$\mu$. Weaker absorptions were shown at 3.35, 8.55 and 9.7–9.9$\mu$.

EXAMPLE 14

0.9 part of 1,2-bis(4,5-dihydroxy-1-formyl-2-oxoimidazolidin-3-yl)ethane-1,2-diol were treated with 4 parts of difluoramine and 6 parts of 96–98% sulphuric acid by the procedure described in Example 1. The product was 0.6 part of crude 1,2-bis[4,5-bis(difluoramino)-1-formyl-2-oxoimidazolidin-3-yl]-1,2-bis(difluoramino)ethane which melted with decomposition at about 125° C. The crude product was purified by precipitation from methanol solution by addition of water. The purified product started to decompose above 200° C. and was found to contain 22.1% carbon, 1.5% hydrogen, 38.9% fluorine and 27.2% nitrogen. 1,2-bis[4,5-bis(difluoramino)-1-formyl-2-oxoimidazolidin-3-yl]-1,2-bis(difluoramino)ethane, $$C_{10}H_8F_{12}N_{10}O_4$$

theoretically requires 21.4% carbon, 1.4% hydrogen, 40.7% fluorine and 25.0% nitrogen.

The infra-red spectrum showed strong absorption maxima at 5.7$\mu$ due to =CO, at 10.9 and 11.45$\mu$ due to NF$_2$ and also at 3.1, 3.2, 7.05, 8.0, 8.6 and 12.9$\mu$. Weaker absorptions were shown at 10.6$\mu$ due to —NF$_2$ and also at 9.8, 12.3 and 13.45$\mu$.

What we claim is:

1. A difluoramino compound of the formula:

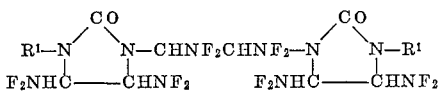

wherein $R^1$ is selected from the group consisting of hydrogen, lower alkyl, trinitro lower alkyl, difluoroamino lower alkyl and lower acyl radicals.

2. A compound according to claim 1 which is 1,2-bis[4,5 - bis(difluoramino)-1-isopropyl-2-oxoimidazolidin-3-yl]-1,2-bis(difluoramino)ethane.

3. A compound according to claim 1 which is 1,2-bis[4,5 - bis(difluoramino)-1-ethyl-2-oxoimidazolidin-3-yl]-1,2-bis(difluoramino)ethane.

4. A compound according to claim 1 which is 1,2-bis[4,5 - bis(difluoramino)-1-methyl-2-oxoimidazolidin-3-yl]-1,2-bis(difluoramino)ethane.

5. A compound according to claim 1 which is 1,2-bis[4,5 - bis(difluoramino) - 2 - oxoimidazolidin-3-yl]-1,2-bis(difluoramino)ethane.

6. A compound according to claim 1 which is 1,2-bis[4,5 - bis(difluoramino)-1-acetyl-2-oxoimidazolidin-3-yl]-1,2-bis(difluoramino)ethane.

7. A compound according to claim 1 which is 1,2-bis[4,5 - bis(difluoramino) - 1-difluoraminomethyl-2-oxoimidazolidin-3-yl]-1,2-bis(difluoramino)ethane.

8. A compound according to claim 1 which is 1,2-bis[4,5 - bis(difluoramino) - 1-(2,2,2-trinitroethyl)-2-oxoimidazolidin-3-yl]-1,2-bis(difluoramino)ethane.

9. A compound according to claim 1 which is 1,2-bis[4,5 - bis(difluoramino)-1-formyl-2-oxoimidazolidin-3-yl]-1,2-bis(difluoramino)ethane.

10. A process for the preparation of a difluoramino compound as defined in claim 1 which comprises reacting an oxoimidazolidine compound of the formula:

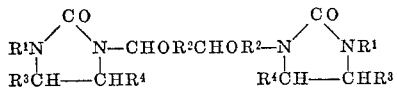

wherein $R^1$ is a member of the group consisting of hydrogen, lower alkyl, lower alkoxyalkyl, trinitro lower alkyl and lower acyl radicals, $R^2$ is a member of the group consisting of hydrogen, lower alkyl and lower acyl radicals, and $R^3$ and $R^4$ are members of the group consisting of hydroxy, lower alkoxy and lower acyloxy radicals, with difluoramine in an inert atmosphere and in the presence of an acidic condensing agent.

11. A process as defined in claim 10, wherein $R^1$ of the starting oxoimidazolidine compound is a member of the group consisting of hydrogen, methyl, ethyl, isopropyl, methoxymethyl, trinitroethyl, formyl and acetyle radicals, $R^2$ is a member of the group consisting of hydrogen, methyl and acetyl radicals, and $R^3$ and $R^4$ are members of the group consisting of hydroxy, methoxy and acetoxy radicals.

12. A process as defined in claim 10, wherein the starting oxoimidazolidine compound is a member of the group consisting of: 1,2-bis(4,5-dihydroxy-1-isopropyl-2-oxoimidazolidin-3-yl)ethane-1,2-diol, 1,2-bis(4,5-dihydroxy-1-ethyl-2-oxoimidazolidin-3-yl)ethane-1,2-diol, 1,2-bis(4, 5 - dihydroxy-1-methyl-2-oxoimidazolidin-3-yl)ethane-1, 2-diol, 1,2-bis(4,5-dihydroxy-2-oxoimidazolidin-3-yl)ethane-1-,2-diol, 1,2-bis(4,5-dimethoxy-2-oxoimidazolidin-3-yl)-1,2-dimethoxyethane, 1,2-bis(4,5-dimethoxy-2-oxoimidazolidin-3-yl)ethane-1,2-diol, 1,2-bis(4,5 - diacetoxy-1-acetyl-2- oxoimidazolidin-3-yl)-1,2-diacetoxyethane, 1,2-bis(4,5 - dimethoxy-1-methoxymethyl-2-oxoimidazolidin-3-yl)-1,2-dimethoxyethane, 1,2-bis(4,5-dimethoxy-1-(2,2, 2 - trinitroethyl)-2-oxoimidazolidin-3-yl)ethane - 1,2-diol and 1,2-bis(4,5-dihydroxy-1-formyl-2-oxoimidazolidin-3-yl)ethane-1,2-diol.

13. A process as claimed in claim 10 wherein the acidic condensing agent comprises concentrated sulphuric acid, oleum or halogenosulphonic acid.

14. A process as claimed in claim 13 wherein the acidic condensing agent comprises fluorosulphonic acid.

15. A process as claimed in claim 10 wherein the reaction is carried out in presence of excess difluoramine under conditions of difluoramine reflux.

16. A process as claime in claim 10 wherein a formaldehyde source is present in the reaction mixture.

17. A process as claimed in claim 16 wherein the formaldehyde source comprises paraformaldehyde.

References Cited

UNITED STATES PATENTS 3,375,259   3/1968   Gibson et al. _____ 260—309.7

OTHER REFERENCES

Banks, Fluorocarbons and Their Derivatives, Oldbourne Press, London, 1964, pp. 85 and 86.

LELAND A. SEBASTIAN, Primary Examiner

U.S. Cl. X.R.

149—109